United States Patent [19]

Iwaszkiewicz et al.

[11] Patent Number: 5,245,970
[45] Date of Patent: Sep. 21, 1993

[54] PRIMING RESERVOIR AND VOLUME COMPENSATION DEVICE FOR HYDRAULIC UNIT INJECTOR FUEL SYSTEM

[75] Inventors: Titus J. Iwaszkiewicz, Woodridge; David B. Meisner, Carol Stream; Ronald J. Rogalla, Melrose Park, all of Ill.

[73] Assignee: Navistar International Transportation Corp., Chicago, Ill.

[21] Appl. No.: 941,271

[22] Filed: Sep. 4, 1992

[51] Int. Cl.$^5$ ............................ F02N 17/00; F02M 59/00
[52] U.S. Cl. ................................... 123/447; 123/179.9; 123/179.17; 123/446
[58] Field of Search ............... 123/446, 447, 456, 514, 123/516, 179.9, 179.11, 179.12, 179.13, 179.17; 417/200, 205, 490

[56] References Cited

U.S. PATENT DOCUMENTS

| | | | |
|---|---|---|---|
| Re. 33,270 | 7/1990 | Beck et al. | 123/447 |
| 3,689,205 | 9/1972 | Links | 417/401 |
| 3,796,205 | 3/1974 | Links et al. | |
| 4,271,807 | 6/1981 | Links et al. | 123/506 |
| 4,372,272 | 2/1983 | Walter et al. | 123/467 |
| 4,440,134 | 4/1984 | Nakao et al. | 123/447 |
| 4,448,169 | 5/1984 | Badgley et al. | 123/467 |
| 4,449,507 | 5/1984 | Mayer | 123/467 |
| 4,480,619 | 11/1984 | Igashira et al. | 123/446 |
| 4,589,395 | 5/1986 | Timms et al. | 123/516 |
| 4,603,671 | 8/1986 | Yoshinaga et al. | 123/467 |
| 4,605,166 | 8/1986 | Kelly | 123/446 |
| 5,121,730 | 6/1992 | Ausman et al. | 123/381 |

Primary Examiner—Willis R. Wolfe
Assistant Examiner—Thomas Moulis
Attorney, Agent, or Firm—Dennis K. Sullivan

[57] ABSTRACT

A diesel engine having a lubricating oil sump and a low pressure lubricating oil pump, is provided with a hydraulically-operated, electronically-controlled unit fuel injector operating system of the type having a unit fuel injector, a high pressure pump, a high pressure lubricating oil supply passage from said pump to said unit injector, a fuel supply to said unit injector, and an electronically controlled valve in said unit injector for controlling the application of the pressure of the lubricating oil to force said fuel to be expelled from said injector, wherein a priming reservoir is operatively connected to the low pressure lubricating oil pump and disposed upstream and above the high pressure supply pump and above the high pressure supply passage, preferably being disposed in the engine front cover and having a restricted return line to the oil sump for venting air from said reservoir, a siphon passage establishes fluid communication between said reservoir and said high pressure passage independently of the high pressure supply pump, and a check valve is disposed in the siphon passage to permit fluid flow from said reservoir to said high pressure passage, when the engine is not operating, while preventing flow from the high pressure passage to the priming reservoir, when the engine is operating.

16 Claims, 4 Drawing Sheets

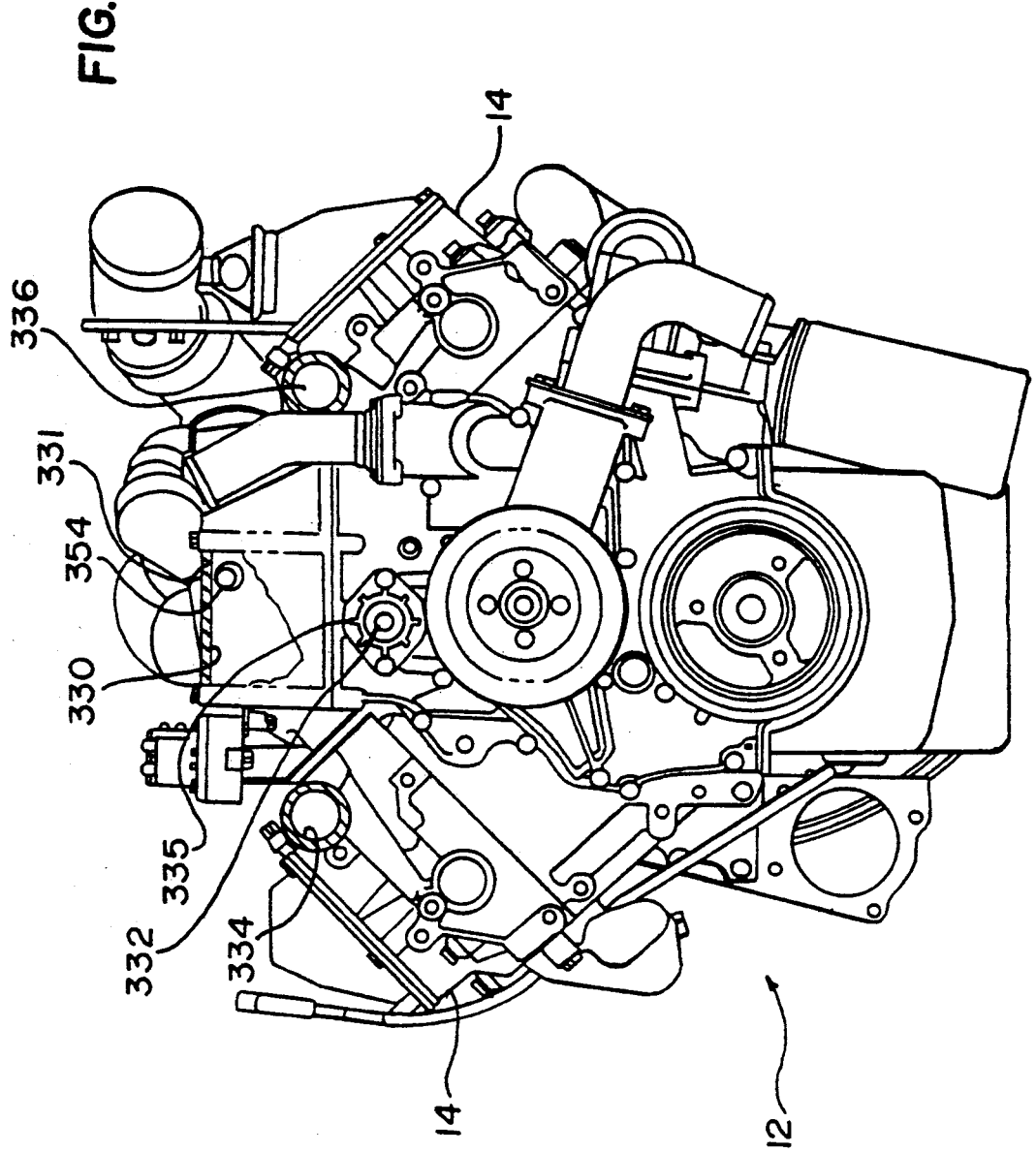

5,245,970

PRIMING RESERVOIR AND VOLUME COMPENSATION DEVICE FOR HYDRAULIC UNIT INJECTOR FUEL SYSTEM

BACKGROUND OF THE INVENTION

The present invention relates generally to fuel injection systems for engines and, more particularly to a hydraulically-operated, electronically-controlled unit injector fuel system wherein the hydraulic fluid supply system therefor is provided with a priming reservoir and a device for compensating changes in the hydraulic fluid volume within the system which may occur due to temperature changes.

BACKGROUND ART

A hydraulically-operated, electronically-controlled unit injector is shown in U.S. Pat. No. 3,689,205 issued to Links on Sep. 5, 1972. In this unit injector, a solenoid assembly is provided which moves a poppet valve that controls actuating fluid in the unit injector in order to control fuel injection delivery.

U.S. Pat. No. 5,121,730 teaches the hydraulically-operated, electronically-controlled fuel injection system described in this application including certain aspects of the system invented by the Applicants hereof. In the fuel injection system as schematically illustrated in FIG. 1 thereof, the priming reservoir and hydraulic fluid volume compensation device of the present invention not being shown therein, a high pressure pump supplies engine lubricating oil through a common oil rail which, under control of a solenoid operated valve at each unit injector, supplies the actuating fluid to cause fuel to be injected by the unit injector.

However, when the engine is started, it is first necessary to supply actuating fluid pressure to the injectors before fuel can be delivered to the cylinders. If the actuating fluid, in this case, lubricating oil, should drain back into the oil sump of the engine, a time delay will be created before the engine can be started. And cold weather starting would aggravate the problem.

Further, during engine operation with such a system, the oil temperature typically increases from ambient temperature to 245° F. causing the density to decrease and the volume of fluid in the system to expand. After the engine is shut down and the oil temperature decreases, the volume contracts, by as much as 20% in cold ambient conditions, causing voids to form in the oil rail. Subsequently, in a cold start of the engine, it is necessary to fill the voids in the oil system by cranking the engine before pressure can be built up to cause injection of fuel into the cylinders of the engine. This adds excessive cranking time required to start the engine under very cold conditions and additionally drains available power from the vehicle batteries.

The present invention is directed to overcoming the problems set forth above.

SUMMARY OF THE INVENTION

Accordingly, it is an object of the invention described and claimed herein to provide a hydraulically-operated unit injector system for an engine of the type having a high pressure supply pump with a priming reservoir disposed upstream of and above the high pressure pump inlet.

It is a further object of the invention described and claimed herein to provide a hydraulically-operated unit injector system for an engine having a device for compensating the volume of the actuating fluid to prevent the occurrence of voids within the actuating fluid system.

This and other objects and advantages as will become more apparent are specifically met in a diesel engine having a lubricating oil sump, a low pressure lubricating oil pump, and a hydraulically-operated, electronically-controlled unit fuel injector operating system of the type having a unit fuel injector, a high pressure pump, a high pressure lubricating oil supply passage from said pump to said unit injector, a fuel supply to said unit injector, and an electronically controlled valve in said unit injector for controlling the application of the pressure of the lubricating oil to force said fuel to be expelled from said injector, wherein a priming reservoir is operatively connected to the low pressure lubricating oil pump and disposed upstream and above the high pressure supply pump and above the high pressure supply passage, preferably being disposed in the engine front cover and having a restricted return line to the oil sump for venting air from said reservoir, a siphon passage establishes fluid communication between said reservoir and said high pressure passage independently of the high pressure supply pump, and a check valve is disposed in the siphon passage to permit fluid flow from said reservoir to said high pressure passage, when the engine is not operating, while preventing flow from the high pressure passage to the priming reservoir, when the engine is operating.

BRIEF DESCRIPTION OF THE DRAWINGS

Other objects and advantages of the invention will become more apparent upon perusal of the detailed description thereof and upon inspection of the drawings in which:

FIG. 4 is a front elevation, partially cut away, of an internal combustion engine incorporating the hydraulically-actuated electronically-controlled unit injector fuel system of the present invention.

DESCRIPTION OF THE PREFERRED EMBODIMENT

Figure 1:
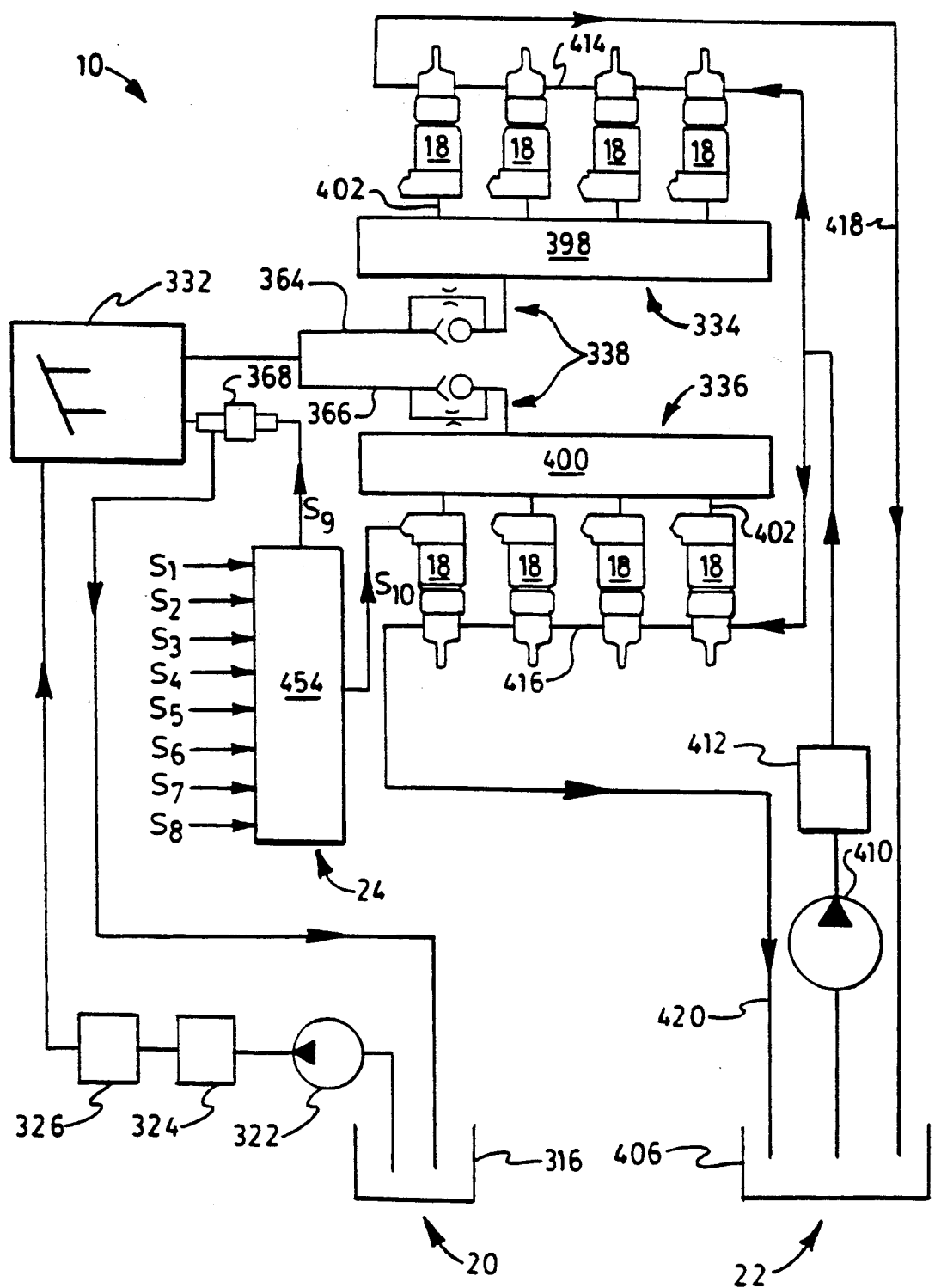
FIG. 1 is a diagrammatic general schematic view of a hydraulically-actuated electronically-controlled unit injector fuel system of the present invention, including both an actuating fluid circuit and a fuel injection circuit, for an internal combustion engine having a plurality of unit injectors.

Referring to FIG. 1, a hydraulically-actuated electronically-controlled unit injector fuel system 10, hereinafter referred to as a HEUI fuel injection system. The exemplary HEUI fuel injection system 10 is shown in FIGS. 1, 2, 3, and 4 is adapted for a diesel-cycle direct-injection internal combustion engine 12. While a vee-type eight cylinder engine is illustrated and described herein, it should be understood that the invention is also applicable to other types of engines, such as in-line cylinder engines and rotary engines, and that the engine may contain fewer or more than eight cylinders or combustion chambers. The exemplary engine 12, only partially shown in FIGS. 2 and 4, has a pair of cylinder heads 14. Each cylinder head 14 has four unit injector bores 16.

Figure 2:
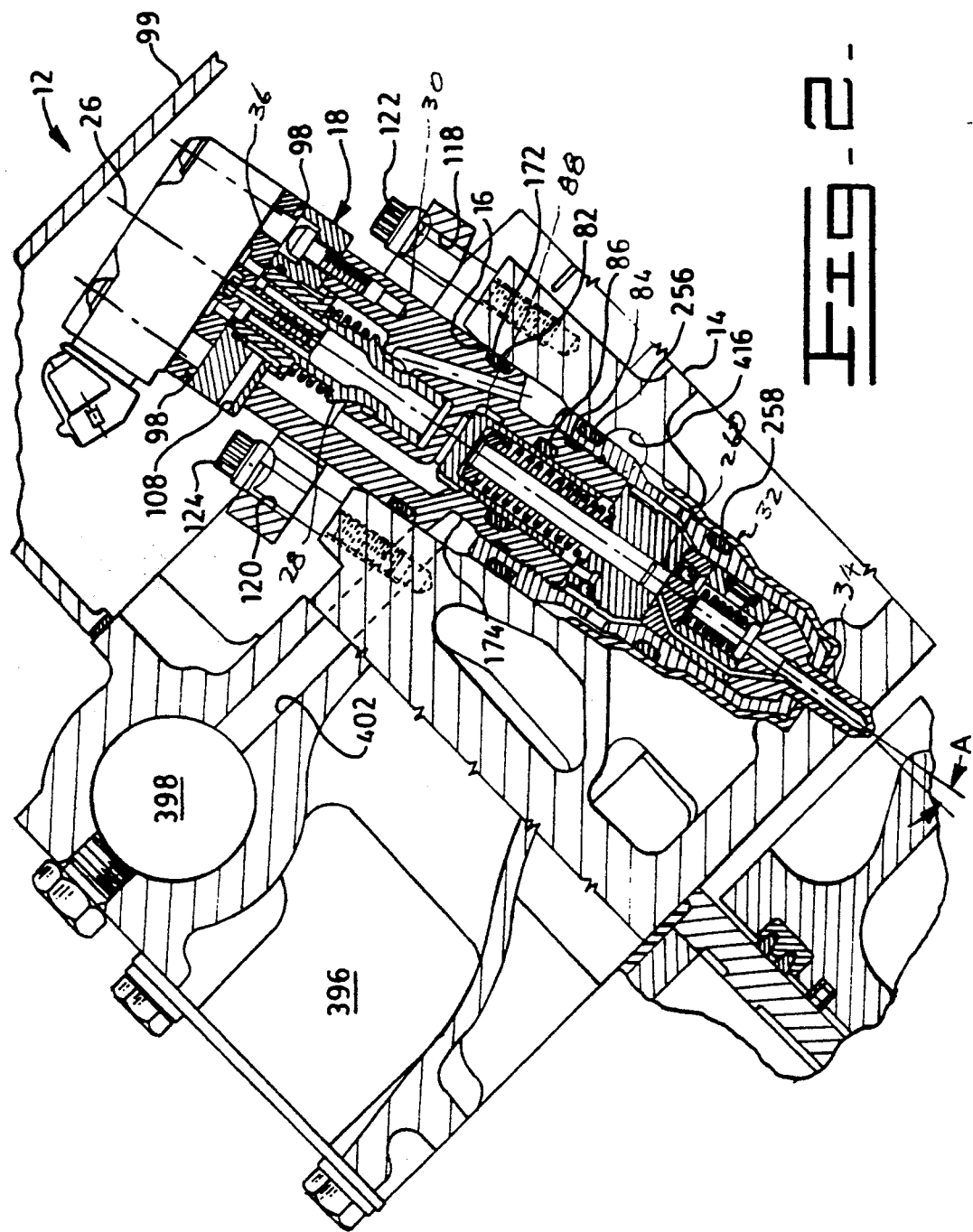
FIG. 2 is a diagrammatic partial cross-sectional view of one embodiment of a unit injector of FIG. 1 as installed in an exemplary internal combustion engine.

Referring to FIGS. 1 and 2, the HEUI fuel injection system 10 includes one or more hydraulically-actuated electronically-controlled unit injectors 18 adapted to be positioned in a respective unit injector bore 16, means or device 20 for supplying hydraulically actuating fluid and damping fluid to each unit injector 18, means or device 22 for supplying fuel to each unit injector 18, and means or device 24 for electronically controlling the HEUI fuel system 10. Each unit injector 18 has a longitudinal axis 26 and includes an actuator and valve assembly 28, the valve movement being controlled by a solenoid 36, a body assembly 30, a barrel assembly 32, and a nozzle and tip assembly 34. The longitudinal axis 26 defines a selected angle A with respect to the axis of the engine combustion chamber.

The actuator and valve assembly 28 is provided as a means or device for selectively communicating either relatively-high-pressure actuating fluid or relatively-low-pressure damping fluid to each unit injector 18 in response to the solenoid 36 receiving an electronic control signal $S_{10}$ shown in FIG. 1. High pressure fluid, preferably lubricating oil, is supplied from a common rail 398 integrally incorporated in the head 14 to an annulus 174 on the injector body 30 and the fluid is supplied to the valve 28. When the valve 28 is opened by the solenoid 36 attached thereto, the high pressure fluid is presented to the upper end of intensifier piston 88. Relatively low pressure fuel, which is fed to the injector through a common rail passage 416 in the head 14, is present in the fuel pump chamber 260 disposed at the bottom of the intensifier piston 88 and is caused, by the force supplied by the high pressure fluid to the intensifier piston, to be ejected from the injector through a relatively conventional differential nozzle assembly. Since the present invention is directed to the means for supplying the high pressure fluid, i.e., the lubricating oil, to the injector, the details of the injector assembly will not be further discussed. Those interested are referred to U.S. Pat. No. 5,121,730 for a discussion of the unit injector per se.

Figure 3:
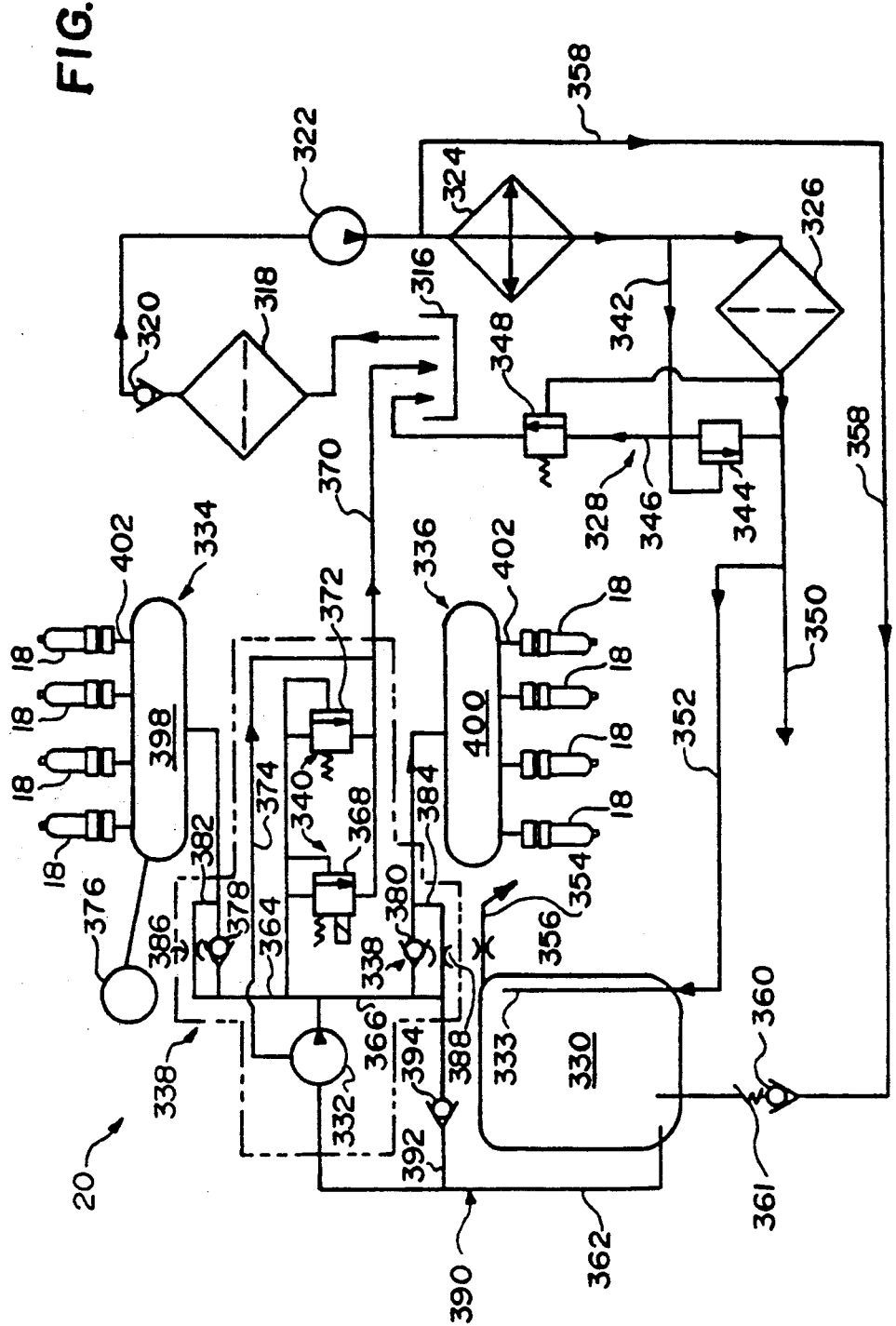
FIG. 3 is a diagrammatic detailed schematic view of the hydraulically actuating fluid and damping fluid supplying means generally shown in FIG. 1.

Referring primarily to FIG. 3, the hydraulically actuating fluid and damping fluid supplying means 20 comprises a main actuating fluid circuit which preferably includes an actuating fluid sump 316, a pickup screen-type filter 318, a one-way flow check valve 320, an actuating fluid transfer pump 322, an actuating fluid cooler 324, one or more actuating fluid filters 326, a means or device 328 for bypassing actuating fluid with respect to the fluid filters 326, a priming or engine starting reservoir 330, a relatively-high-pressure actuating fluid pump 332, first and second high pressure actuating fluid manifolds 334, 336, means or device 338 for controlling the creation of Helmholtz resonance of pressure waves between the manifolds 334, 336 and between the pump 332 and either manifold 334, 336, and a means or device 340 for controlling the pressure level in the manifolds 334, 336.

Preferably, the fluid chosen for the actuating fluid is not fuel but is a liquid fluid having a relatively higher viscosity than fuel under the same conditions. For example, the actuating fluid may be engine lubricating oil. In this example, the actuating fluid sump 316 is the engine lubrication oil sump.

The check valve 320 is provided as an anti-siphon valve in order to help maintain actuating fluid in the circuit. After engine shutdown, the circuit remains primed with sufficient actuating fluid in order to facilitate quick starting of the engine 12.

The transfer pump 322 is of a conventional design of the type used for supplying the engine lubricating system but having a larger capacity due to its use in supplying actuating fluid for the injectors. For example, the transfer pump 322 may be a gerotor pump which develops a relatively low pressure (for example, about 413 kPa or 60 psi).

The filters 326 are preferably of the replaceable element type. The filter bypassing means 328 includes a bypass line 342 connected upstream and downstream of the fluid filters 326. The filter bypassing means 328 further includes a filter bypass valve 344, positioned in the bypass line 342, and a return line 346 connected between the bypass line 342 and the sump 316. The filter bypassing means 328 further includes an actuating fluid pressure regulator 348 positioned in the return line 346.

During engine operation, if the fluid filters 326 become plugged with debris, the pressure downstream of the fluid filters 326 will begin to decrease. If that pressure falls below a selected level (for example, about 138 Kpa or 20 psi), the filter bypass valve 344 is activated which permits the actuating fluid to bypass the fluid filters 326 and continue flowing towards the priming reservoir 330. The pressure regulator 348 is provided as a means for preventing the actuating fluid which is upstream of the pump 332 from exceeding a selected pressure (for example, about 345 kPa or 50 psi). If that selected pressure is exceeded, the excess actuating fluid is returned to the sump 316.

Downstream of the fluid filters 326, the actuating fluid is split into first and second branch passages 350, 352 if engine lubricating oil is chosen as the actuating fluid. Most of the lubricating oil flows (for example, about 57 liters per minute or 15 gallons per minute) into the first branch passage 350 which supplies the engine lubricating system (not shown). The remainder of the lubricating oil (for example, about 15 liters per minute or 4 gallons per minute), amounting to about 25-33% of the total flow, flows into the second branch passage 352 which communicates with the priming reservoir 330 of the main actuating fluid circuit.

The priming reservoir 330 is provided as a means for priming and thereby facilitating rapid pressurization of the high pressure pump 332 during engine startup. The priming reservoir 330 is also provided to supply the actuating fluid to the volume compensation device 390 as will be discussed below. The priming reservoir 330 is positioned upstream of the pumping chamber(s) of the high pressure pump 332 and is arranged in closer fluid communicating proximity to the pump 332 than to the separate sump 316.

As shown in FIG. 4, the priming reservoir 330 is incorporated in a front cover 331 of the engine 12 at a level not only above the pump 332 but also above the level of the high pressure manifolds 334, 336. A standpipe 333 is provided to fill the priming reservoir at its highest elevation from line 352 thereby preventing the reservoir 330 from emptying when the engine is not in operation. At or near the highest elevation of the fluid level of the priming reservoir 330, there is a return line 354 with a selected flow restriction 356 therein which returns the low pressure lubricating oil back to the sump 316. Preferably, the flow restriction 356 is a fixed flow area orifice to maintain pressure in the reservoir during operation of the engine. The return line 354 and flow restriction 356 are provided in order to bleed air from the priming reservoir 330 and direct the air back to the sump 316 of the engine.

Upstream of the cooler 324 is a cooler/filter bypass line 358 which completely bypasses the cooler 324 and fluid filters 326 and communicates directly with the priming reservoir 330 independently of oil supply line 352. The cooler/filter bypass line 358 is provided as a means or device for automatically making up or replenishing any actuating fluid that is deficient in the priming reservoir 330 and for maintaining adequate oil pressure to the inlet of the high pressure pump 332 during the first few minutes of cold engine operating conditions when the viscosity of the actuating fluid is relatively higher. The cooler/filter bypass line 358 has a one-way flow check valve 360 disposed therein.

During cold temperature operation of the hydraulically actuating fluid and damping fluid supplying means 20, the check valve 360 opens fluid flow through the cooler/filter bypass line 358 and towards the priming reservoir 330 if the fluid pressure in the priming reservoir 330 is less than the fluid pressure in the outlet of the transfer pump 322 by a selected amount. This difference in pressure causes the check valve 360 to open to some corresponding extent and feed a portion or all of the actuating fluid directly to the priming reservoir 330 without being filtered. Flow through the cooler/filter bypass line 358 is activated whenever the normal oil supply system 352 leading to the priming reservoir 330 is not able to completely fill the priming reservoir 330. When the differential pressure between the priming reservoir 330 and the outlet of the lubricating oil pump 322 reaches a level predetermined by the spring 361, the differential pressure across the check valve 360 is closed and flow of completely filtered actuating fluid is resumed to the priming reservoir 330. The minimum differential opening pressure selected for valve 360 is such that when the engine is in normal warmed-up engine operation, the valve 360 will remain closed. Thus, the differential pressure must exceed the difference between the maximum expected lubricating oil pump outlet pressure and the minimum operating pressure of priming reservoir 330 under hot conditions, the latter pressure being regulated by valve 348 as described above. Under cold operating conditions, due to the higher viscosity of the oil, the outlet pressure of the pump 322 will be much greater than under warmed-up conditions whereas the priming reservoir pressure may be lower than the pressure regulated by valve 348. Consequently, a much larger pressure drop across valve 360 will occur to open the valve. An opening pressure differential for valve 360 of about 80 psi is preferred.

At or near the bottom (lowest elevation) of the priming reservoir 330, there is a pump supply passage 362 which is connected to an inlet of the high pressure pump 332. Preferably, the highest level or elevation of the actuating fluid in the priming reservoir 330 is higher than the highest level of actuating fluid in the pumping chamber(s) of the high pressure pump 332 in order to ensure that the high pressure pump 332 remains completely primed with actuating fluid and is also above the level of the high pressure manifolds 334, 336 for reasons to be seen hereinafter.

Preferably, in order to minimize cost, the high pressure pump 332 is a fixed displacement axial piston pump which is mechanically driven by the engine 12 through gear 333 partially shown in FIG. 4. The high pressure pump 332 operates in conjunction with a primary variable pressure regulator to be discussed below. Alternatively, the high pressure pump 332 may be a variable displacement axial piston pump without the primary variable pressure regulator. In a HEUI fuel injection system 10 for a vee-type engine 12, the high pressure pump 332 is preferably located at the front of the engine 12 at or near the apex of the vee formed by the pair of cylinder heads 14. The outlet of the high pressure pump 332 communicates with first and second manifold supply passages 364, 366. Each of the first and second manifold supply passages 364, 366 communicates with a respective manifold 334, 336.

Preferably, the manifold pressure controlling means 340 includes an electronically-controlled primary pressure regulator 368. The primary pressure regulator 368 is connected between the outlet of the high pressure pump 332 and a return line 370 which communicates with the sump 316. The primary pressure regulator 368 is provided as a means or device for varying the pressure in the manifolds 334, 336 between selected limits (for example, about 2067 to 20670 kPa or 300 to 3000 psi). By varying the actuating fluid pressure in the manifolds 334, 336, the injection pressure of the fuel delivered by the unit injectors 18 is consequently varied. The manifold pressure controlling means 340 further includes a pressure relief valve 372 which backs up the primary pressure regulator 368 and protects the manifolds 334, 336 from exceeding a selected pressure (for example, about 27560 kPa or 4000 psi.

When activated, the primary pressure regulator 368 and/or pressure relief valve 372 direct excess actuating fluid through the return line 370 that communicates with the sump 316. Fluid leakage in the high pressure pump 332 is communicated through a case drain passage 374 which is connected to the return line 370 communicating with the sump 316. An actuating fluid pressure sensor 376 is provided in at least one of the manifolds 334, 336 and sends a signal $S_6$ back to the electronic controlling means 24.

The Helmholtz resonance controlling means 338 includes a one-way flow check valve 378, 380 positioned in each of the first and second manifold supply passages 364, 366 connecting the high pressure actuating fluid pump 332 with each of the manifolds 334, 336. The Helmholtz resonance controlling means 338 further includes a bypass line 382, 384 having a selected flow restriction 386, 388 therein which is connected in parallel with each check valve 378, 380. Alternatively, the selected flow restriction 386, 388 may be integrally formed with the check valve 378, 380 to constitute an orificed check valve. Preferably, each flow restriction 386, 388 is a fixed flow area orifice but, alternatively, may a variable flow area orifice.

The Helmholtz resonance controlling means 338 is provided in order to controllably minimize or prevent the creation of Helmholtz resonance of pressure waves which would naturally occur between the two interconnected high pressure manifolds 334, 336 and also the pump 332 and either manifold 334, 336. Controlling Helmholtz resonance helps to maintain a more uniform pressure over time in each manifold 334, 336 at a constant pressure setting of the primary pressure regulator 368. The check valves 378, 380 isolate fluid communication from one manifold to the other. The bypass line 382, 384 and flow restrictions 386, 388 minimize fluid communication from one manifold 334, 336 to the other which dissipates fluid energy released when its respective check valve 378, 380 is closed. The bypass lines 382, 384 and flow restrictions 386, 388 also perform three other functions. First, they function as a means or device for bleeding down the pressure in each manifold 334, 336 during engine operation after the electronic control module 454 signals the primary pressure regulator 368 to lower the pressure in the manifolds 334, 336. They also function as a means or device for bleeding down the high pressure in the manifolds after engine shutdown so that the unit injectors 18 may be removed for servicing without spilling actuating fluid from the engine 12. Moreover, if the actuating fluid was not bled down from the manifolds 334, 336 after engine shutdown and upon restarting the engine 12, the unit injectors 18 would tend to produce black smoke or other undesirable emissions and also cause a very audible knocking noise. Second, they function as a means or device for equalizing the pressure of the actuating fluid communicated to both the first and second manifolds (334, 336) during operation of the fuel injection system (10). Third, they form part of the hydraulic makeup circuit described immediately below. The flow area of each flow restriction 386, 388 and mass and displacement of the check valves 378, 380 are chosen in accordance with the system pressure, flow requirements, operating frequency, and hydraulic configuration of the HEUI fuel injection system 10.

The actuating fluid circuit also includes a volume compensating device 390 for automatically making up or replenishing voids in the fluid in each manifold 334, 336 which may occur after engine shutdown due to cooling and contraction of actuating fluid and/or precipitation of entrained air from the actuating fluid. As described above, without the make up means or volume compensating device 390, the lost volume of actuating fluid in each manifold 334, 336 would delay engine startup until the high pressure pump 332 is able to refill the lost volume in the manifolds 334, 336. The device 390 preferably includes an actuating fluid siphon passage 392. The siphon passage 392 bypasses the inlet of the high pressure pump 332 and is connected directly between the priming reservoir 330 and the manifolds 334, 336. The siphon passage has a one-way flow check valve 394 therein which permits flow by gravity and by suction from the priming reservoir 330 to the manifolds 334, 336 only when the high pressure pump 332, i.e., the engine 12, is not operating. As discussed above, it is necessary to the operation of the volume compensating device 390 as described herein for the level of fluid in the priming reservoir 330 to be above the level of the manifolds 334, 336. Otherwise, it would be necessary to maintain pressure in the priming reservoir 330 when the engine is not operating which is not practical. The volume compensation device 390 also includes the bypass lines 382, 384 and flow restrictions 386, 388 which supply actuating fluid to a respective manifold 334, 336.

Preferably, one actuating fluid manifold 334, 336 is provided for and associated with each cylinder head 14 having a bank of unit injectors 18. For example, in a vee-type engine 12, two actuating fluid manifolds 334, 336 are provided. In the embodiment shown in FIG. 2, each actuating fluid manifold 334, 336 is integrally formed with an air intake manifold 396 and the respective cylinder head 14. Alternatively, each actuating fluid manifold 334, 336 may be a separate component which is connected to the respective cylinder head 14. One advantage of integrating the actuating fluid manifolds 334, 336 as internal passages of the engine 12 is the elimination of external high pressure actuating fluid lines which would add cost and complicate assembly and reliability of the HEUI fuel injection system 10 relative to the engine 12. Another advantage is the neater or relatively uncluttered and more aesthetically appealing appearance of the engine 12 which makes it easier to access for service or repair. The uncluttered appearance of the engine also makes it easier to adapt or install for various vehicle applications.

Each actuating fluid manifold 334, 336 has one common rail passage 398, 400 and a plurality of rail branch passages 402 communicating with the common rail passage 398, 400. The number of rail branch passages corresponds to the number of unit injectors 18 positioned in each cylinder head 14. Each common rail passage 398, 400 extends across the respective cylinder head 14 in spaced and parallel relation to the entire bank of unit injectors 18 positioned in each cylinder head 14. As shown in FIG. 2, each of the rail branch passages 402 also communicates with a respective unit injector bore 16 formed in the cylinder head 14 and the second annular peripheral groove 174 defined in the respective unit injector 18. The annular peripheral groove 174 of the unit injector 18 and bore 16 define an annulus which ensures that the high pressure actuating fluid communicated by the rail branch passage 402 to the unit injector 18 exerts a substantially uniform or balanced pressure all the way around the outer periphery of the unit injector 18. This prevents the unit injector 18 from experiencing an unbalanced high pressure side load if there were no annulus between the rail branch passage 402 and the actuating fluid inlet passages 158 of the unit injector 18.

As shown in FIG. 1, the high pressure fluid circuit may be completed from the injectors 18 through a common return passage 414, 416 from the injectors returning fluid through return passages 418, 420 to the fluid reservoir 22. However, when the actuating fluid is lubricating oil, as shown in FIG. 3, the actuating fluid returned from the injectors need only be deposited on the cylinder head 14 for return by gravity through the valve push rod openings therein to the engine oil pan or sump 316, thereby eliminating return lines 414, 416 and 418, 420.

Other aspects, objects, and advantages of this invention can be obtained from a study of the drawings, the disclosure, and the appended claims.

What is claimed is:

1. In an engine having a hydraulically-operated, electronically-controlled unit fuel injector operating system of the type having a unit fuel injector, a high pressure pump, passage means for delivering high pressure actuating fluid from said pump to said unit injector, means for supplying fuel to said unit injector, and valve means in said unit injector for controlling the application of said actuating fluid force said fuel to be expelled from said injector, the improvement comprising volume compensating means operatively associated with said actuating fluid passage means and comprising an actuating fluid reservoir, a fluid supply line establishing fluid communication between said actuating fluid reservoir and said high pressure passage means, and a check valve disposed in said fluid supply line and disposed to permit fluid flow from said reservoir to said passage means in the absence of pressure from said high pressure pump while preventing flow from said passage means to said reservoir.

2. The invention in accordance with claim 1 wherein said actuating fluid reservoir is disposed to have a fluid level higher than said high pressure passage means.

3. The invention in accordance with claim 2 wherein said actuating fluid flows through said fluid supply line under the influence of gravity and suction caused by contraction of the volume of oil in said high pressure passage means.

4. The invention in accordance with claim 1 wherein said actuating fluid reservoir is disposed upstream of said high pressure pump and in fluid communication with an inlet thereof.

5. The invention in accordance with claim 4 wherein said actuating fluid is engine lubricating oil.

6. In an engine having a lubricating oil pump, a hydraulically-operated, electronically-controlled unit fuel injector operating system of the type having a unit fuel injector, a high pressure pump, passage means for delivering high pressure lubricating oil from said pump to said unit injector, means for supplying fuel to said unit injector, and valve means in said unit injector for controlling the application of said actuating fluid force said fuel to be expelled from said injector, the improvement comprising a priming reservoir disposed upstream of said high pressure pump and in fluid communication with an inlet thereof and low pressure oil passage means establishing fluid communication between an outlet of said lubricating oil pump and said reservoir.

7. The invention in accordance with claim 6 wherein said priming reservoir is disposed above said high pressure pump.

8. The invention in accordance with claim 7 wherein said priming reservoir is incorporated in a front cover of said engine.

9. The invention in accordance with claim 7 wherein a restricted return passage means establishes fluid communication between an upper portion of said priming reservoir and a lubricating oil sump of said engine.

10. The invention in accordance with claim 6 wherein said low pressure passage means establishing fluid communication between an outlet of said lubricating oil pump and said reservoir includes oil filter means and a bypass means bypassing said oil filter means further comprising a second low pressure passage means establishing fluid communication between an outlet of said lubricating oil pump and said reservoir, said second low pressure passage means being a bypass passage characterized by the absence of oil filter means and oil cooler means therein, and normally closed check valve means disposed in said second low pressure passage means, said check valve means being disposed to open to permit flow therethrough from said lubricating oil pump to said reservoir upon the pressure in said reservoir being lower than the pressure in said inlet of said high pressure pump by a predetermined amount.

11. In an engine having a lubricating oil pump, an oil sump, and a hydraulically-operated, electronically-controlled unit fuel injector operating system of the type having a unit fuel injector, a high pressure pump, high pressure manifold means for delivering high pressure lubricating oil from said pump to said unit injector, means for supplying fuel to said unit injector, and valve means in said unit injector for controlling the application of said actuating fluid force said fuel to be expelled from said injector, the improvement comprising:
a priming reservoir disposed upstream of said high pressure pump and above said high pressure manifold means, said reservoir being in fluid communication with an inlet of said high pressure pump and with an outlet of said lubricating oil pump;
siphon passage means establishing fluid communication between said priming reservoir and said high pressure manifold means independently of said high pressure pump; and
check valve means disposed in said siphon passage means and disposed to permit fluid flow through said siphon passage means from said reservoir to said high pressure manifold means in the absence of pressure from said high pressure pump while preventing flow from said manifold means to said priming reservoir.

12. The invention in accordance with claim 10 wherein a flow restricted return passage means establishes fluid communication between an upper portion of said priming reservoir and said oil sump of said engine.

13. The invention in accordance with claim 10 wherein said priming reservoir is disposed on a front cover of said engine above said high pressure pump.

14. In an engine having a lubricating oil pump, an oil sump, and a hydraulically-operated, electronically-controlled unit fuel injector operating system of the type having a unit fuel injector, a high pressure pump having an inlet, low pressure oil supply means establishing fluid communication between said lubricating oil pump and said inlet of said high pressure pump, said low pressure oil supply means including filter means and bypass means for said filter means, high pressure manifold means for delivering high pressure lubricating oil from said pump to said unit injector, means for supplying fuel to said unit injector, and valve means in said unit injector for controlling the application of said actuating fluid force said fuel to be expelled from said injector, the improvement comprising:
cold oil bypass means for establishing fluid communication between said lubricating oil pump and said high pressure pump inlet independently of said low pressure oil supply means, said bypass means including normally closed check valve means disposed to open and permit flow therethrough to said high pressure pump inlet upon the pressure at said pump inlet being lower than the pressure at said lubricating oil pump by a predetermined amount.

15. The invention in accordance with claim 14 wherein said lubricating oil pump has a maximum outlet pressure and said high pressure pump has a minimum inlet pressure under normal warmed-up engine operation, said predetermined amount exceeding the differential between said maximum outlet pressure and said minimum inlet pressure.

16. The invention in accordance with claim 14 and a priming reservoir disposed in fluid communication with said pump inlet, said low pressure oil supply means and said cold oil bypass means both being disposed to fill said reservoir.

* * * * *